June 5, 1962  E. R. SCHUTZ  3,037,509
APPARATUS FOR REMOVING SKIN PARTICLES FROM A DONOR AREA
AND APPLYING THE PARTICLES TO A RECIPIENT AREA
Filed Nov. 25, 1957  5 Sheets-Sheet 1
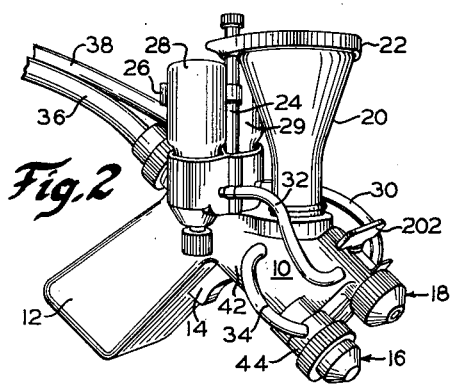
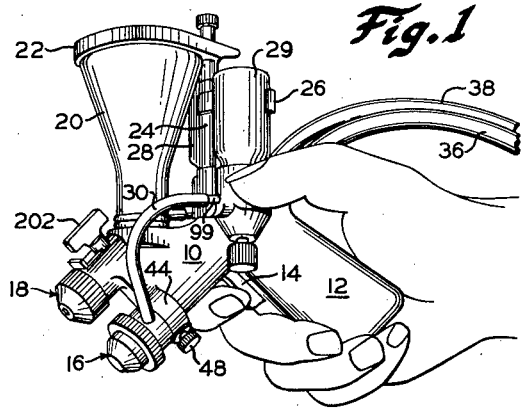
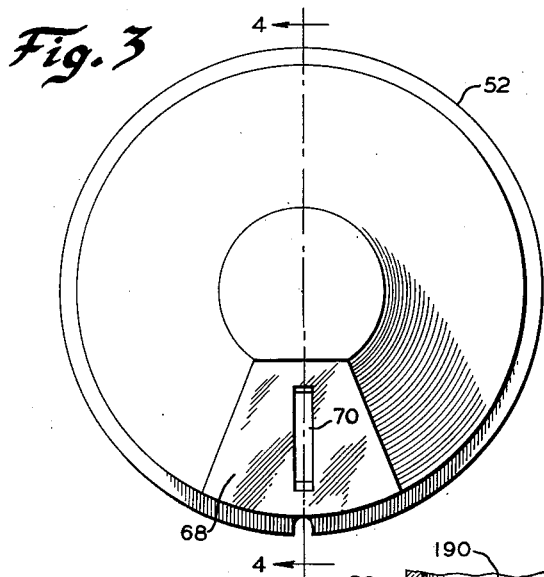
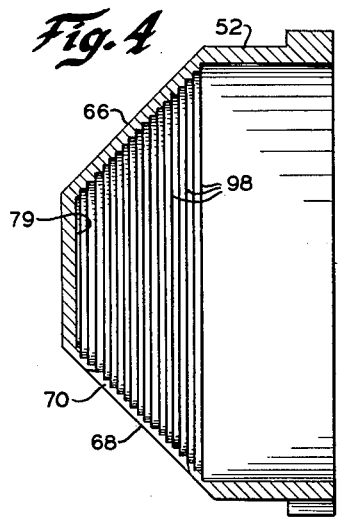
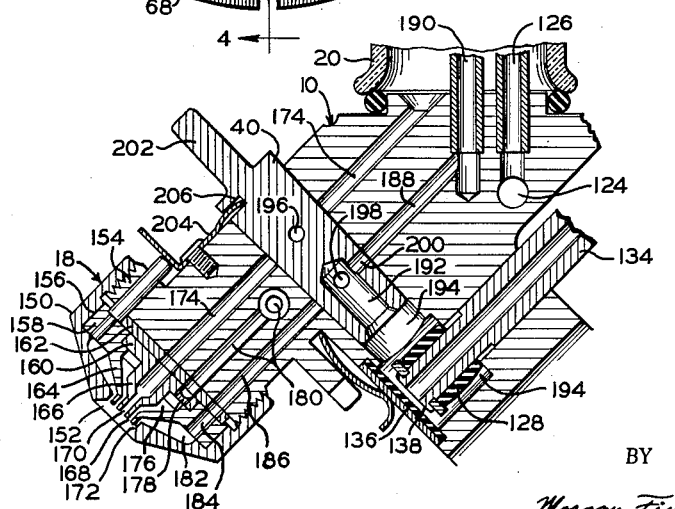
INVENTOR.
E. ROBERT SCHUTZ
BY
Morgan, Finnegan, Durham & Pine
ATTORNEYS INVENTOR.
E. ROBERT SCHUTZ
BY
Morgan, Finnegan, Durham & Pine
ATTORNEYS

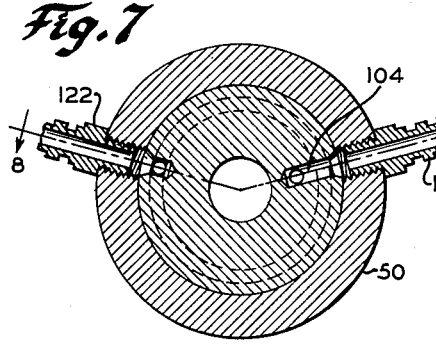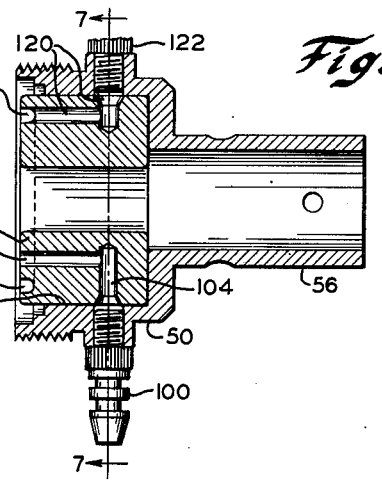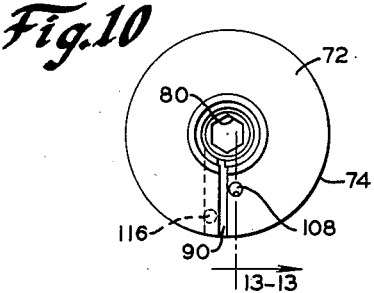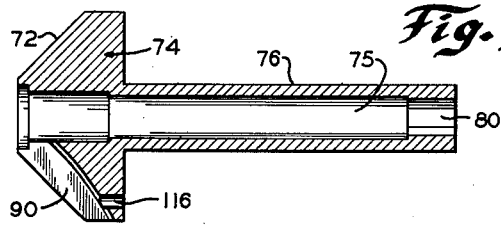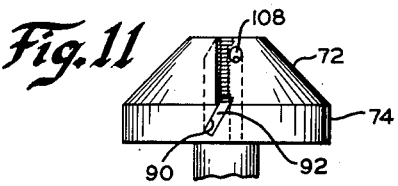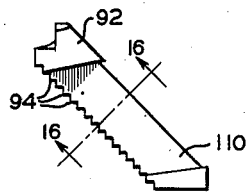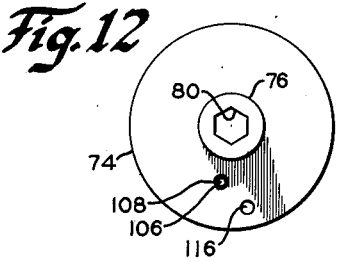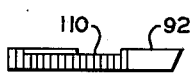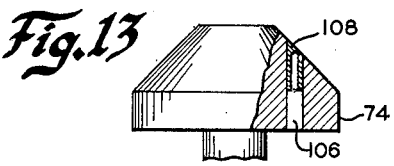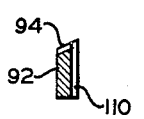

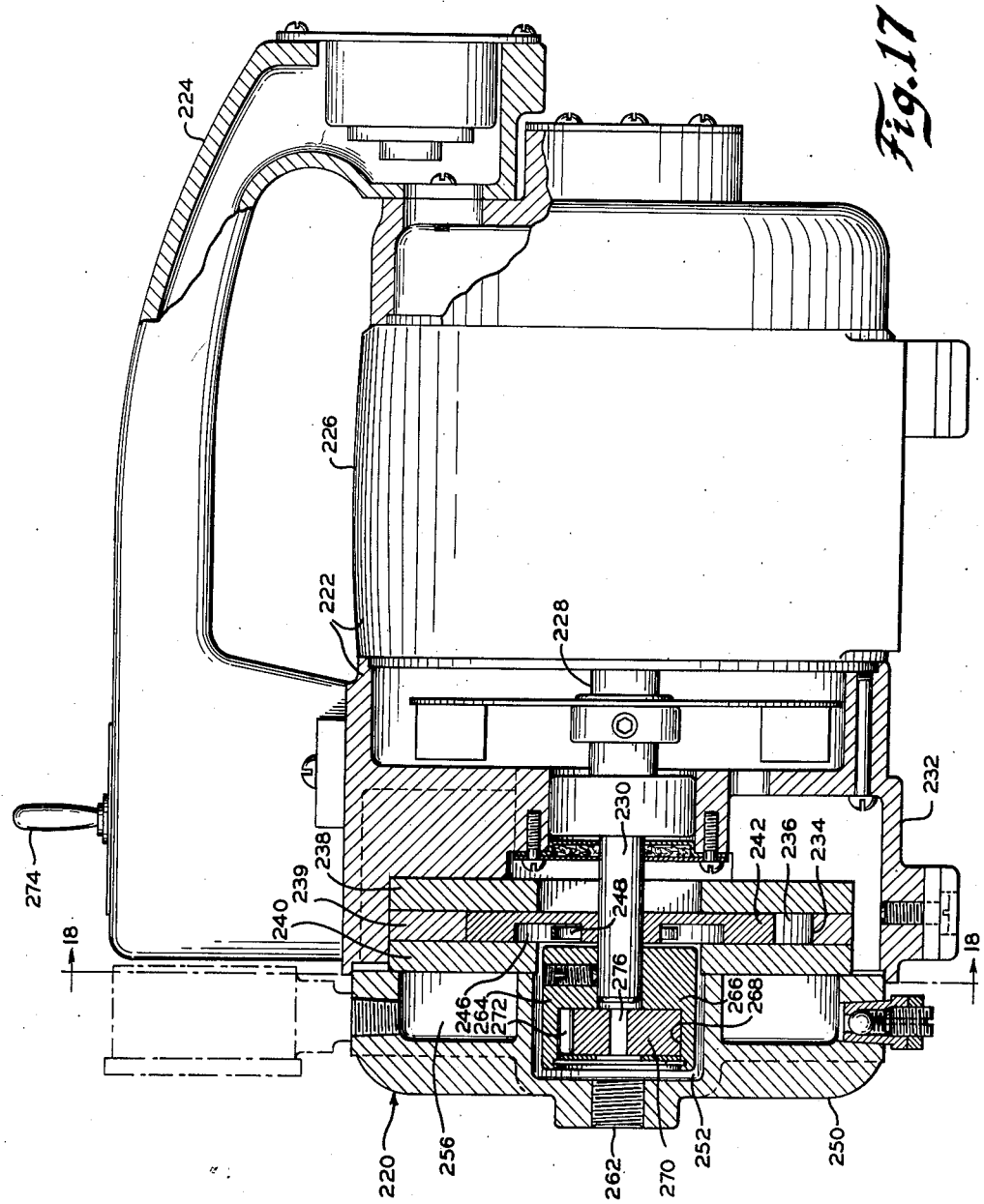

INVENTOR.
E. ROBERT SCHUTZ

United States Patent Office 3,037,509
APPARATUS FOR REMOVING SKIN PARTICLES FROM A DONOR AREA AND APPLYING THE PARTICLES TO A RECIPIENT AREA
Emil Robert Schutz, Madison, N.J.
(% Pitco Products, Inc., Rte. 10, Hanover, N.J.)
Filed Nov. 25, 1957, Ser. No. 698,789
15 Claims. (Cl. 128—305)

The invention relates generally to dermatomes and more particularly to specialized apparatus for removing particles of live skin from a donor area and applying the excised particles to a recipient area.

The apparatus is intended for use in the process of skin grafting in which individual microscopic particles of skin are removed from the donor area, suspended in a liquid solution and subsequently applied in solution to the recipient area.

It is among the objects of the invention to provide a single apparatus that will both remove and collect microscopic particles of skin from the donor area and which will also be capable of applying the particles to the recipient area. An additional object of the invention is to provide such an apparatus which will remove and apply a large number of skin particles easily and quickly. Still further, the invention has for an objective the provision of such an apparatus sufficiently light in weight and compact in structure as to be suitable for easy and convenient manual operation in surgical use and one adapted to facilitate the removal of microscopic skin particles from the donor and especially from relatively inaccessible and awkward areas of the body. Another object of the invention is to provide such an apparatus which may be readily assembled and disassembled by mechanically unskilled persons, such as operating room personnel, and which may be sterilized without injury by autoclaving. Still another object of the invention is to provide an apparatus capable of cutting minute skin particles of proper size from the donor area and with substantial uniformity and one in which the cutting of the particles will be done cleanly, without any shearing or tearing of the epithelial tissue so as to minimize trauma. The present invention also has for its object apparatus having means for preventing excised particles from clumping together and for adequately flushing the particles of skin from the cutting elements so that said cutting elements are free from skin particles during the cutting operation. It is also an object of the invention to provide, in such an apparatus, for the proper flushing of the cutting elements with a minimum of flushing fluid so as to maintain as high a ratio of skin particles to flushing fluid as possible. Still further it is an object of the invention to provide apparatus for applying the skin particles in suspension to the recipient area which will prevent clogging of the skin particles. It is also an object of the invention to provide apparatus for applying the skin particles to the recipient area and, if desired, at the same time to automatically mix with the skin particles a coagulating or other additive agent and to mix the coagulating or additive agent with the skin particles being applied to the recipient area after the particles have left the apparatus.

Further objects of the invention will be pointed out in the following general and detailed description of a preferred embodiment of the invention or will be obvious therefrom.

Generally and briefly, the invention comprises a single apparatus which will both remove the skin particles from a donor area and apply them to a recipient area. For compactness the apparatus may comprise a hand held instrument having cutting and suction means for drawing a portion of the skin from the donor area into the apparatus and excising microscopically small particles therefrom, means for receiving and storing the cut particles and applicating means in the form of a spray nozzle in communication with the receiving means for applying the cut particles to a recipient area. In combination with the hand held instrument the apparatus also comprises driving means for the cutting head and a source of vacuum and of clean air under pressure.

For the purpose of facilitating use, the hand held instrument may advantageously take the shape of a pistol with the cutting and suction head and spray nozzle mounted at the front end thereof. Preferably, the spray nozzle is mounted immediately above the cutting head. The cutting head may be provided with a beveled surface at an angle with the longitudinal axis of the pistol-like casing of the instrument whereby the angle at which the instrument is used to excise the skin particles from the donor area may substantially coincide with the most convenient disposition of the hand. A slot is provided in the beveled surface and a vacuum is applied to the slot so as to draw through the slot the skin from the area from which the particles are to be taken. Inside the cutting head there is provided a rotating cutter device having a plurality of teeth on the outer casing of the cutter head so as to cut the skin cleanly and without any tearing. For the purpose of flushing the excised skin particles from the cutting elements there is provided an access passage through which the flushing medium and the suction of the vacuum may wash the particles. From this access passage the particles are conveyed to the storage container. In order to minimize the amount of flushing fluid used in the cutting operation the flushing fluid is conveyed to the cutting blade only once every revolution and only in metered quantities.

The particles of skin enter the storage container through an inlet conduit which extends upwardly well into the interior of the container. The particles then collect at the base or lower portion of the container. An outlet opening in the bottom of the container communicates without any bends or turns with a spray nozzle. In the preferred form of the invention the nozzle is of the aspirator type in which the exit of air under pressure from the nozzle induces a flow of the suspended solution of skin particles from the container. Communication between the spray nozzle and the container is controlled by a valve which, in one position, subjects the container to a vacuum pressure and at the same time interrupts communication between the nozzle and the container. In a second position the valve simultaneously cuts off the container from the source of vacuum, re-establishes communication between the valve and the nozzle and valves clean air under pressure to the nozzle.

Means are provided whereby additive agents, such as coagulating agent, may be automatically mixed with the skin particles at the spray nozzle and preferably after the skin particles have left the nozzle. Suitable containers for the coagulating or other additive agent and the flushing medium are mounted on the pistol-like casing and are provided with suitable tubing for conveying the fluid and the agent from the containers to the cutting head in the nozzle.

It will be understood that the foregoing general description and the following detailed description as well are exemplary and explanatory of the invention but are not restrictive thereof.

Of the drawings:
FIG. 1 is a perspective view of a preferred form of the apparatus showing the operative position of the apparatus;
FIG. 2 is an opposite hand perspective view of the figure shown in FIG. 1 with the operator's hand removed;

FIG. 3 is a front view of the outer casing for the cutter head;

FIG. 4 is a side view, in section, of the outer casing for the cutter head taken along the line 4—4 in FIG. 3 looking in the direction of the arrows;

FIG. 5 is a sectional view of a portion of the apparatus showing the control mechanism in position for the cutting operation of the apparatus;

FIG. 7 is a sectional view taken along the line 7—7 in FIG. 8 looking in the direction of the arrows;

FIG. 8 is a sectional view taken along the line 8—8 of FIG. 7 looking in the direction of the arrows;

FIG. 9 is a sectional view of an element of the cutting head assembly;

FIG. 10 is a front view of the same assembly;

FIG. 11 is a bottom view of the element shown in FIG. 10 with the cutting blade in position;

FIG. 12 is a rear view of the element shown in FIG. 9;

FIG. 13 is a view, partly in section, taken along the line 13—13 in FIG. 10 looking in the direction of the arrows;

FIG. 14 is a plan view of a preferred form of the cutting blade;

FIG. 15 is a front elevation of the blade;

FIG. 16 is a view, partly in section, taken along the line 16—16 in FIG. 14 looking in the direction of the arrows;

FIG. 17 is a side view, partly in section, of the pump and driving motor for the apparatus;

Figure 6:
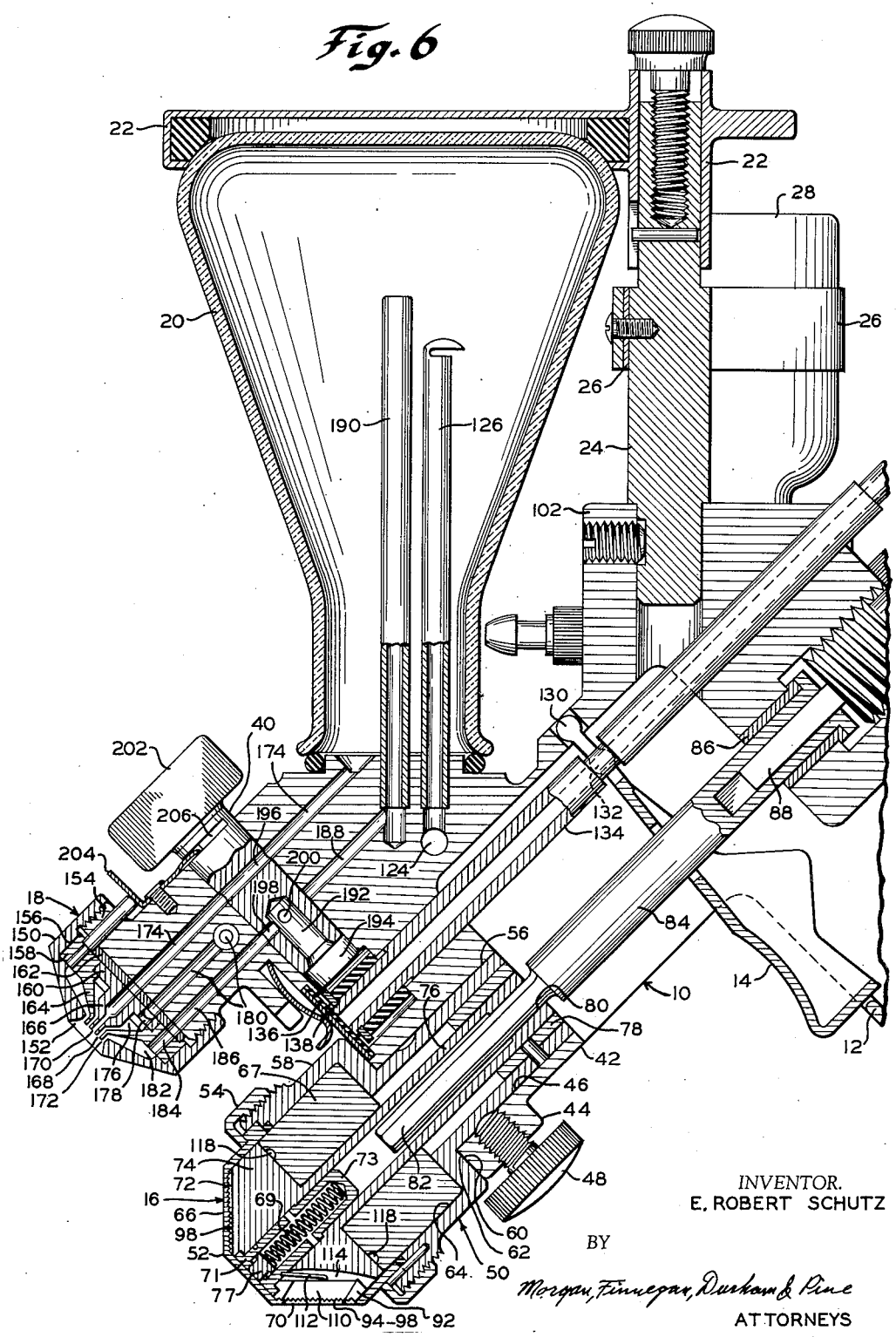
FIG. 6 is an enlarged sectional view of the apparatus showing the parts in position for the spray operation.

Referring at first to FIGS. 1 and 2 for a detailed description of a preferred embodiment of the invention, there is shown a casing 10 in the form of a pistol having a handle portion 12, a trigger actuating mechanism 14, and at its front end, a cutting and suction head 16 and a spray nozzle 18. Mounted on the upper portion of the pistol-like casing 10 is a large vial or storage container 20 into which the excised skin particles are received and stored after being cut from the donor area and prior to being applied to the recipient area. The container or vial 20 is secured by means of a strap 22 to a central post 24 secured to the upper portion of the casing 10 and the post 24 is also provided with a bracket 26 which serves to support a pair of similar but smaller vials or supply containers 28, 29 for the flushing fluid and the additive or coagulating agent. A conduit in the form of a flexible tube 30 is provided between the right-hand vial 29 (as shown in FIG. 1) and the cutter head 16 and this conduit serves to convey flushing fluid from the supply container 29 to the cutter head 16. Similar flexible tubing 32 is mounted between the left-hand vial 28 (see FIG. 2), and the spray nozzle 18 and serves to convey a coagulating or other additive agent to the nozzle. A third flexible tube 34 serves as a conduit between the cutting head 16 and the storage container 20 for the skin particles and serves to convey the skin particles in solution from the cutting head to the container. Entering the casing 10 at the rear portion thereof is a flexible drive shaft 36 which is connected between a power source (not shown) and the rotating elements of the cutting head 16. In addition, a flexible tube 38 also enters the casing adjacent the drive shaft and connects the apparatus with a suitable source of pressure and vacuum. At the front of the casing 10 adjacent the spray nozzle 18 there is a valve 40 by which the application of vacuum or pressure may be selectively controlled. In FIG. 2 valve 40 is shown in position for applying a vacuum to the container 20 and cutting head 16 and in FIG. 1 valve 40 is shown in position for applying air under pressure to the nozzle 18.

Having reference now to FIG. 6, the internal structure of the apparatus will next be described. At its forward or front end the barrel 42 of the pistol-like casing 10 is provided with a boss 44 adapted to receive the substantially cylindrical cutter and suction head assembly 16, the head 16 being inserted in an opening 46 in the front end of the barrel 42 and being maintained therein by means of the set screw 48 positioned at the underside of the boss 44. The cutter and suction head assembly 16 generally comprises an inner sleeve or casing 50 and an outer casing 52 removably joined together by means of a threaded lock nut 54. The inner casing 50 is provided with a reduced diametral portion 56 which is inserted in the opening 46 in the barrel 42 of the casing 10 and also with an enlarged forward portion 58; the shoulder formed at the junction of the two diameters providing a surface 60 which bears against the face 62 of the boss 44 on the casing 10. Additionally, the forward end of the inner casing 58 is recessed so as to provide a substantial opening 64 therein. Mounted within this opening is a bearing block 67.

The outer casing 52 of the cutter and suction head assembly 16, in the preferred form shown in the drawings, is of generally frustro-conical shape. For the purpose of facilitating use the angle of the beveled surface 66 formed by the frustro-conical shape of the outer casing is approximately 45° with respect to the longitudinal axis of the casing 10. This angle may be varied over substantial ranges as desired in order to place the pistol-like casing 10 during the cutting operation in a position which is most convenient for the operator. It will be understood that the configuration of the outer casing 52 need not be frustro-conical or even circular as long as an angled surface is provided. The underside portion 68 of the beveled surface 66 (see FIGS. 3 and 4) is preferably cut away so as to form a substantially flat surface area and a longitudinal slot 70 is formed in this flat surface through which the skin is drawn during the cutting operation. In the preferred embodiment of the invention the flat surface 68 serves to reduce the thickness of the outer casing at the slot 70 so as to facilitate the entrance of the skin but this surface may be omitted where the thickness of the casing is otherwise of the desired dimension.

Mounted within the outer casing 52 and having an outer surface 72 in general conformity with the frustro-conical shape of the outer casing is a rotatable carrier 74. At its rearward end the carrier 72 is provided with a long cylindrical shaft-like extension 76 that extends in bearing alignment with the carbon bearing 67 and a second bearing 78 mounted on the end portion of the extension 76 in the inner casing 56 of the cutter and suction head assembly 16. A hexagonal opening 80 (FIG. 12) is provided in the rearward end of this shaft-like extension 76 so as to receive a similarly shaped extension 82 on a rotatable shaft 84 journalled in an end bearing 86 at the rear of the casing 10 and connected to the driving member 88 of the flexible shaft 36. Rotation of the flexible shaft 36 thereby results in rotation of the rotatable carrier 74 mounted in the cutter and suction head assembly 16 through the intermediate shaft 84 and its hexagonally-shaped extension 82. The carrier 74 is held firmly in contact with the bearing block 67 by means of a spring 69 interposed between the two small sleeves 71, 73 located in the central opening 75 in the carrier. One end of the spring 69 abuts a slidable, cup-like member 77 that engages the inner surface 79 of the outer casing 52 so that the compression of the spring acts to force the carrier 74 backwardly into engagement with the bearing block 67.

As will best be seen in FIGS. 9–16 the rotatable carrier 74 is provided with an inclined slot 90 in its beveled outer surface 72, the slot 90 being adapted to receive therein a cutting blade 92. The cutting blade 92 is provided with a plurality of minute serrations or teeth 94 and is dimensioned so that the teeth extend above the beveled surface 72 of the rotatable carrier 74 but not beyond the root of the teeth. As mounted in the slot 90 in the rotatable carrier 74 the teeth 94 on the blade 92 extend into a series of grooves formed on the inner surface of the outer casing 52 by correspondingly-shaped serrations 98. In addition to serving as guide means for the cutter blade 92 as it rotates with the carrier 74 the serrations 98 on the inner surface of the outer casing 52 cooperate with the teeth 94 on the cutter blade in a manner similar to pinking shears to cleanly cut the epithelial tissue from the donor area without any shearing or tearing and therefore with a minimum of trauma.

The flushing fluid from the container 29 is supplied to the cutter and suction head 16 through the tubing 30. Suitable fittings 99, 100 to receive the tubing are provided in the base of the holder 102 for the supply container 29 and also in the inner casing 50 of the cutter and suction head assembly 16. The fitting 100 on the inner casing 50 communicates with a passageway 104 formed in the annular carbon bearing 67 seated within the recess 64 therein. The passageway 104 in the carbon bearing, in turn, communicates with an opening 106 formed in the rotatable carrier 74. The opening 106 in the carrier 74 is provided with a metered plug 108 so that the amount of fluid which may pass therethrough is carefully controlled. The opening 104 in the bear 67 and in the opening 106 in the rotatable carrier 74 coincide only once every revolution of the carrier and so the flushing fluid is delivered from the supply container 29 through the conduit 30 and passageways 104, 106 to a point immediately preceding the cutting blade just after the cutting blade has completed its cutting action. The fluid thus delivered to the cutting blade 92 washes the excised particles from the face of the teeth of the blade downwardly through an access passageway formed by a stepped recess 110 formed in the forward side of the blade 92. The slot 90 in which the blade 92 resides in the rotatable carrier 74 is deeper than the blade and a spring 112 is provided which acts against the bottom of the blade 92 and the slot 90 to push the blade outwardly to maintain it in an operative position. The clearance area 114 between the bottom of the slot and the blade serves as a collecting station for the particles flushed from the face of the teeth 94 of the blade 92. A small opening or passageway 116 communicates this area with an annular passageway 118 formed in the face of the carbon bearing 67 which, in turn, is communicated by means of suitable passageways 120 with a fitting 122 mounted on the outer portion of the inner casing 50. The flexible tube 34 is mounted on the fitting 122 and on another fitting (not shown) adjacent the mid-portion of the barrel 42 of the pistol-like casing 10 and this latter fitting communicates through the passageway 124 with an entry tube 126 mounted in the storage container 20. Since the storage container is under a vacuum pressure during the cutting operation the particles are thus sucked through the passageway 124, up through the tube 126 from whence they are directed downwardly into the container.

The spray nozzle 18 is mounted on the front of the casing 10 immediately above the cutter and suction head 16 and comprises an outer nozzle member 150 having a central flared aperture 152. Nozzle member 150 is threaded to a correspondingly threaded boss 154 on the casing 10 and provided with a recess 156. Mounted within the recess 156 is an intermediate annular ring 158 and mounted within the annular ring 158 is inner apertured member 160. The ring 158 and inner apertured member 160 are held against a gasket 162 by the nozzle member 150. Both the ring 158 and member 160 are provided with forwardly extending portions 164, 166 terminating in concentric openings 168, 170 positioned in the central portion of the opening 152 so as to form still another concentric opening 172. The central opening 170 communicates with a passageway 174 in the casing 10 leading to the bottom of the storage container 20. Passageway 174 is purposely made without turns or bends to avoid clogging due to the skin particles clotting together. Opening 168 communicates with the space 176 between members 160 and 158 and then through an opening 178 in the inner member 160, through a passageway 180 in the casing 10 to the tube 32 to the container 28. The opening 172 communicates with the space 182 between the nozzle member 150 and the intermediate ring 158 and through an opening 184 in the ring to the passageway 186 in the casing 10. Passageway 186 is in line with a similar passageway 188 leading to a second inlet tube 190 for the storage container 20.

A rotatable plug valve 40 is inserted into the top of the casing 10 and is positioned so as to interrupt the passageway 174 and to separate the passageways 186 and 188. At the bottom of the valve there is a recess 192 that opens onto a valve chamber 194 in the casing 10. In addition to the recess 192 the valve 40 is provided with a passageway 196 which, in one position of the valve, coincides with the two portions of the passageway 174 and is also provided with two short passageways 198, 200, spaced 90° apart, that alternately communicate the passageways 186 and 188 with the recess 192. The valve 40 is rotated by means of a fingerpiece 202, movement of the valve through 90° being limited by a retainer 204 inserted into a slot 206.

The application of the suction pressure to the storage container 20 for the skin particles and of the clean air pressure to the spray nozzle 18 is controlled by the trigger mechanism 14 on the pistol-like casing 10. The trigger 14 is pivotally connected to the casing at a point 130 on its upper portion and, at a second point 132, is connected to a slidable hollow tube 134. The hollow tube 134 is connected, at the back of the casing 10, to the tube 38 from the source of vacuum and at the forward end of the casing 10 abuts against a disc-like valve seat 136. When the trigger 14 is in the position shown in FIG. 6 the tube 134 bears against the valve seat 136 and no vacuum or pressure is communicated with the apparatus. When the trigger 14 is depressed the forward end 138 of the tube 134 is removed from the valve seat 136 (see FIG. 5) and a vacuum is then applied through the hollow tube 134, the chamber 194 surrounding the tube, the recess 192 in the valve 40 and the passageways 200, 188, 190 to the storage container 20. A rubber sleeve 128 on the tube 134 always urges the tube to its seated position.

The operation of the apparatus is as follows: When it is desired to cut the particles of skin from the donor area the driving motor is turned on so as to rotate the cutting elements in the cutter and suction head 16 by means of the flexible drive shaft 36, the intermediate shaft 84, hexagonal extension 82 and the extension 76 on the carrier 74. As the cutter head 16 is placed on the donor area the trigger 14 is depressed thereby moving the tube 134 and valve 138 off the valve seat 136. The vacuum from the pump is then communicated through the tube 134, chamber 194, recess 192, passageway 188 and inlet tube 190 to the storage container 20. Since this container is under vacuum pressure the cutter head is placed under vacuum pressure due to the communication of the storage container with the cutter blade through the inlet 126, passageway 124, the outer tubing 34 and the passageways 120, 118 and 116. The application of this vacuum pressure to the cutter head draws the skin from the donor area into the slot 70 so as to enable the teeth 94 on the cutter blade 92, in cooperation with the serrations 98 on the outer casing, to excise minute particles of skin. At the same time the flushing fluid is sucked from the supply container 29 through the outer tubing 30 and the passageways 104 and 108 and is delivered to the cutting blade once every revolution just after the cutting action has taken place to flush the skin particles from the face of the teeth through the access passageway 110 and on into the container 20.

After the skin particles have been removed from the donor area the apparatus, with simple adjustments, may be used to immediately spray the particles on to the recipient area. To this end means are provided to deliver a positive pressure to the tube 134. The plug valve 40 is rotated to the position shown in FIG. 1 and FIG. 6 and clean air under pressure is then delivered through the recess 192, passageway 186, opening 184 and the space 182 to the outer opening 172 in the nozzle. The exit of this air from this opening induces a flow of the skin particles from the opening 170, and passageway 174. If desired, it also induces a flow of a coagulating or other additive agent through the opening 168, the space 176, opening 178, passageway 180, and outer tube 32 from the supply container 28.

Figure 18:
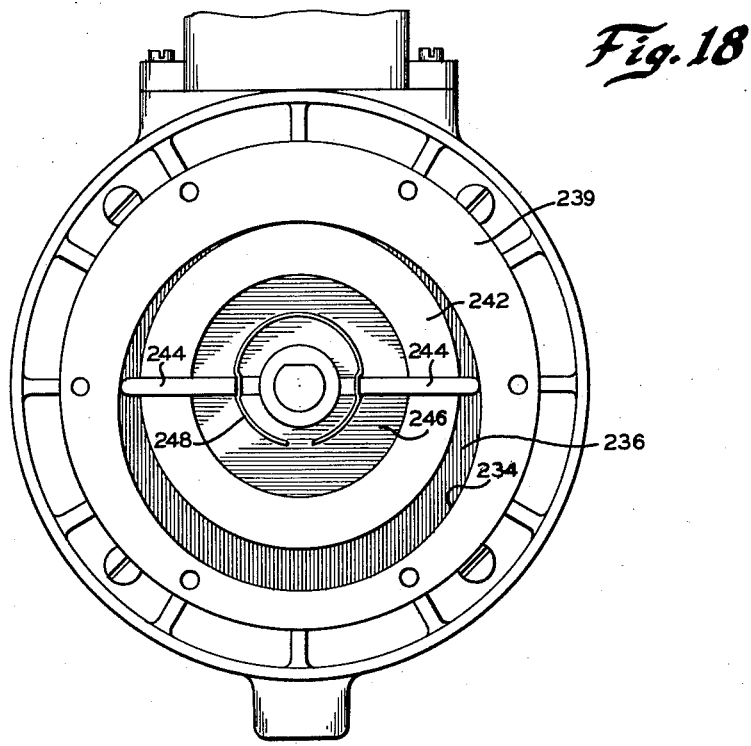
FIG. 18 is a view taken along the line 18—18 in FIG. 17 looking in the direction of the arrows.
Figure 19:
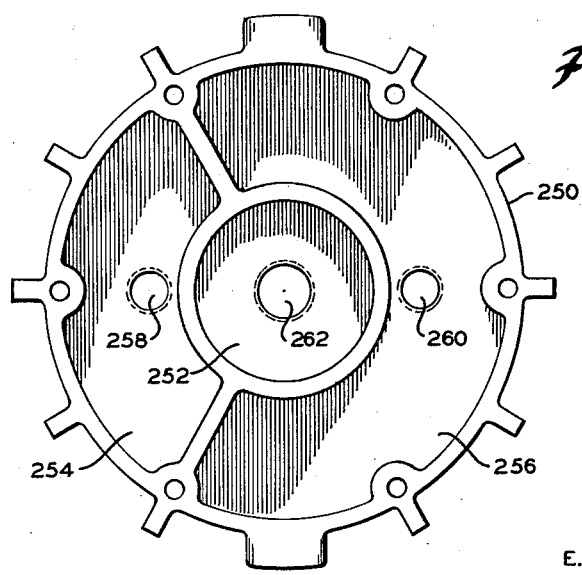
FIG. 19 is an elevational view of the inner side of the cover for the pump.

While any appropriate source of vacuum and positive pressure may be used with the cutting and spraying instrument the particular arrangement of the applicant is especially advantageous. In the embodiment shown in FIGS. 17, 18 and 19 the driving motor for the cutter and suction head and the sources of vacuum and positive pressure are combined into a single structure 220. The structure 220 comprises a combination motor and pump housing 222 having a handle member 224 for easy transport. A reversible electric motor is mounted in the rearward portion 226 of the housing and the armature shaft 228 for the motor is provided with an extension 230 that extends into the forward pump portion 232 of the housing 222. The pump portion 232 comprises a cylindrical section 234 that defines an internal eccentric pump chamber 236. Chamber 236 is formed by three annular carbon members 238, 239, 240 arranged side by side, the opening in the central member 239 being the chamber 236 and the two outer members 238, 240 serving to define the boundaries of the chamber. The armature extension 230 extends through the center of the chamber 236 and is provided with a circular disk 242 in which are mounted a pair of carbon vanes 244. Disk 242 has a central annular recess 246 and spring means 248 are located in the recess and attached to the vanes 244 so as to urge the vanes outwardly against the member 239.

A cover section 250 closes off the cylindrical section 234. The cover 250 is provided with a central circular chamber 252 and two arcuate chambers 254, 256 of unequal size. In the centers of the arcuate chambers 254, 256 there are openings 258, 260 which form the inlet and outlet openings for the pump, the chambers 254, 256 being in communication with the pump chamber 236. The central chamber 252 in the cover 250 is provided with an opening 262 along the central axis thereof. Mounted within the chamber 252 on the end of the shaft extension is a uni-directional clutch 264. The clutch 264 comprises a casing 266 provided with a recess 268. A disk 270 resides in the recess 268 and is provided with three angled slots spaced in the periphery thereof. Each slot has a roller pin 272 which serves as a wedge between the casing 266 and the disk 270 in one direction of rotation, but not in the opposite direction. Disk 270 has an opening 276 to receive the end of the flexible drive shaft 36. Thus rotation of the casing 266 in a clockwise direction (looking at the casing from the cover end) rotates the disk 270 and the cutter head 16 through the flexible drive shaft 36. The connection of the tube 38 to the pump is made so that clockwise rotation of the pump vanes causes the pump to evacuate the storage container 20. Reversing the pump by means of the toggle switch 274 causes the pump to valve clean air under pressure to the spray nozzle and stops rotation of the cutter head 16.

What is claimed is:

1. Apparatus for removing skin particles from a donor area and applying them to a recipient area, said apparatus comprising a casing having a rotary cutting and suction head for removing particles of skin from a donor area, means for driving the rotary cutting head, a storage container on the casing for receiving the skin particles from the rotary cutting head, conduit means connecting said cutting head with said storage container, a spray nozzle on the casing in communication with the storage container for applying the skin particles to a recipient area, means for selectively controlling the application of a vacuum to the suction head and pressure to the nozzle, said casing being formed in the shape of a pistol and the cutting and suction head and spray nozzle being located at the front of the pistol-like casing one above the other, supply means on the container for a flushing fluid, conduit means for conveying the flushing fluid to the cutting head, and supply means on the casing for a conveying a coagulating agent to the spray nozzle.

2. Apparatus for removing skin particles from a donor area and applying them to a recipient area, said apparatus comprising a pistol-like casing having a rotary cutting and suction head mounted at the front thereof, means for driving the rotary cutting head, storage container on the casing for receiving the skin particles from the rotary cutting head, conduit means connecting said cutting head with said storage container, a spray nozzle on the pistol-like casing located above the rotary cutting and suction head and in communication with the storage container for the skin particles, a supply of flushing fluid on the casing in communication with the cutting head, a supply of coagulating agent on the casing in communication with the spray nozzle, and means for selectively controlling the application of a vacuum to the suction head and pressure to the nozzle.

3. In a dermatome an improved cutting head comprising an outer casing having a slot therein, a rotatable cutter mounted in the outer casing, said cutter being provided with a plurality of teeth, and a plurality of serrations on the inner surface of the outer casing complementary to the teeth of the rotating cutter.

4. In a dermatome an improved cutting head as set forth in claim 3 in which the rotating cutter comprises a cutting blade having a plurality of teeth mounted in a rotatable carrier.

5. An improved cutting head as set forth in claim 4 in which the outer casing is provided with a conical outer surface.

6. An improved cutting head as set forth in claim 5 in which the outer beveled surface makes an angle of approximately 45° with the longitudinal axis of the cutting head.

7. An improved cutting head as set forth in claim 4 having means for providing intermediate metered flushing of the blade.

8. An improved cutting head as set forth in claim 7 in which the metered flushing fluid is discharged through an opening in the rotatable carrier immediately preceding the leading edge of the cutter blade.

9. An improved cutting head as set forth in claim 8 having means for applying a suction to the bottom of the blade in the rotatable carrier.

10. An improved cutting head as set forth in claim 9 in which the cutter blade is provided with a recessed side face intermediate its end portions to facilitate removal of the skin particles from the teeth of the cutter blade by the flushing fluid.

11. An improved cutting head as set forth in claim 10 in which the rotatable carrier is provided with an opening communicating with the bottom of the cutter blade and an annular ring conduit to which suction is applied, and the metered flushing port immediately preceding the leading edge of the cutter blade is positioned so as to be aligned with a supply port of flushing fluid once every revolution of the rotatable blade carrier.

12. Apparatus for removing skin particles from a donor area and applying them to a recipient area, said apparatus comprising a pistol-like casing, a rotary cutting head mounted at the front end of said casing, means for driving the cutting head, a spray nozzle on the casing immediately above the cutting head, a container for skin particles received from the cutting head, said container being mounted on the casing in back of the nozzle, valve means for selectively communicating the nozzle and the container with a supply of vacuum and pressure, a supply container on the casing for flushing fluid, a conduit means for conveying the flushing fluid from the container to the cutting head, conduit means connecting the cutting head with the container for skin particles and a trigger-like control means mounted on the casing for controlling the application of the pressure and vacuum.

13. Apparatus as set forth in claim 12 in which the skin particles and vacuum are introduced to the storage container for the skin particles at the upper portion thereof.

14. Apparatus as set forth in claim 12 having a supply container for a coagulating agent and conduit means for conveying the coagulating agent to the spray nozzle.

15. Apparatus as set forth in claim 14 in which the conduit means from the supply containers for the flushing fluid, coagulating agent and from the cutting head to the container for the skin particles comprise tubing mounted on the outside of the casing.

References Cited in the file of this patent
UNITED STATES PATENTS

| | | |
|---|---|---|
| 1,064,053 | Coyle | June 10, 1913 |
| 1,079,799 | Parker | Nov. 25, 1913 |
| 2,721,555 | Jenny | Oct. 25, 1955 |
| 2,786,716 | Peeps | Mar. 26, 1957 |

FOREIGN PATENTS

| | | |
|---|---|---|
| 664,930 | Great Britain | Jan. 16, 1952 |